US006291989B1

(12) United States Patent
Schroeder (10) Patent No.: US 6,291,989 B1
(45) Date of Patent: Sep. 18, 2001

(54) DIFFERENTIAL MAGNETIC POSITION SENSOR WITH ADAPTIVE MATCHING FOR DETECTING ANGULAR POSITION OF A TOOTHED TARGET WHEEL

(75) Inventor: Thaddeus Schroeder, Rochester Mills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/372,949

(22) Filed: Aug. 12, 1999

(51) Int. Cl.[7] ........................................ G01B 7/30
(52) U.S. Cl. ...................... 324/207.21; 324/207.12; 324/207.25; 324/174
(58) Field of Search .................. 324/207.21, 174, 324/207.25, 173, 166, 252, 207.2, 207.12; 338/32 R, 32 H; 327/58, 63, 20

(56) References Cited

U.S. PATENT DOCUMENTS

| | | | | |
|---|---|---|---|---|
| 3,835,400 | * | 9/1974 | Briscoe | 328/168 |
| 3,882,326 | * | 5/1975 | Kruggel | 307/235 R |
| 4,835,467 | * | 5/1989 | Gokhale | 324/166 |
| 4,926,122 | | 5/1990 | Schroeder et al. | 324/207.13 |
| 4,939,456 | | 7/1990 | Morelli et al. | 324/207.21 |
| 5,570,016 | * | 10/1996 | Schroeder et al. | 324/207.25 |
| 5,714,883 | | 2/1998 | Schroeder et al. | 324/207.22 |
| 5,731,702 | | 3/1998 | Schroeder et al. | 324/207.21 |
| 5,754,042 | * | 5/1998 | Schroeder et al. | 324/207.25 |
| 5,818,222 | * | 10/1998 | Ramsden | 324/202 |

\* cited by examiner

Primary Examiner—Jay Patidar
Assistant Examiner—Reena Aurora
(74) Attorney, Agent, or Firm—Margaret A. Dobrowitsky (57) ABSTRACT

A method and apparatus wherein a single dual element galvanomagnetic sensor, herein exemplified by a single dual element magnetoresistive sensor (16'), is utilized to sense crankshaft position and rotational speed from the passage of single tooth edges (12') of a target wheel (10') by continuous adaptive matching of both MR output signals ($V_{MR1'}$, $V_{MR2'}$) during sensor operation. Over a slot (28') or tooth (26'), both MR output signals should be equal, and if not, they are matched by adjusting the current of one of the current sources (30', 32') driving the MRs, performed over a slot or a tooth. Due to higher magnetic sensitivity at smaller air gaps, matching by current adjustment over a tooth is preferred. In a preferred embodiment of the present invention, one MR is driven by a constant current source (30') while the other MR is driven by a voltage controlled current source (32'). The output voltages of the MRs approximate the tooth pattern of the target wheel; they are high over a tooth and low over a slot. Hence, the signals over the teeth can be simply acquired by means of a peak detector (36a, 36b), one for each MR. The signals from the peak detectors are subtracted from each other in a comparator (36c), and then used as a control voltage ($V_C$) for a voltage controlled current source changing its preset nominal current to a value that minimizes the mismatch of MR signals. If matching of MR signals over slots would be desired, valley detectors would be substituted for the peak detectors.

10 Claims, 4 Drawing Sheets

DIFFERENTIAL MAGNETIC POSITION SENSOR WITH ADAPTIVE MATCHING FOR DETECTING ANGULAR POSITION OF A TOOTHED TARGET WHEEL

TECHNICAL FIELD

The present invention relates to a method of sensing precise angular position and speed of rotation of a rotating object and more particularly to a method for sensing crankshaft or camshaft rotational position and speed of rotation wherein a sensor, preferably but not exclusively a single dual element magnetoresistive (MR) sensor, is utilized to sense crankshaft position and rotational speed from the passage of single tooth edges of an encoder or target wheel.

BACKGROUND OF THE INVENTION

It is well known in the art that the resistance modulation of Hall elements or magnetoresistors can be employed in position and speed sensors with respect to moving magnetic materials or objects (see for example U.S. Pat. Nos. 4,835,467, 4,926,122, and 4,939,456). In such applications, the magnetoresistor (MR) is biased with a magnetic field and electrically excited, typically, with a constant current source or a constant voltage source. A magnetic (i.e., ferromagnetic) object rotating relative, and in close proximity, to the MR, such as a toothed wheel, produces a varying magnetic flux density through the MR, which, in turn, varies the resistance of the MR. The MR will have a higher magnetic flux density and a higher resistance when a tooth of the rotating target wheel is adjacent to the MR than when a slot of the rotating target wheel is adjacent to the MR. The use of a constant current excitation source provides an output voltage from the MR that varies as the resistance of the MR varies.

Accurate engine crank position information is needed for ignition timing and OBDII mandated misfire detection. Increasingly more sophisticated spark timing and emission controls introduced the need for crankshaft sensors capable of providing precise position information during cranking. Various combinations of magnetoresistors and single and dual track toothed or slotted wheels (also known as encoder wheels and target wheels) have been used to obtain this information (see for example U.S. Pat. Nos. 5,570,016, 5,714,883, 5,731,702, and 5,754,042).

The crank position information is encoded on a rotating target wheel in the form of teeth and slots. The edges of the teeth define predetermined crank positions. The sensor is required to detect these edges accurately and repeatably over a range of air gaps and temperatures. Virtually all such sensors are of the magnetic type, either variable reluctance or galvanomagnetic (e.g., Hall generators or magnetoresistors). Galvanomagnetic sensors are becoming progressively most preferred due to their capability of greater encoding flexibility and speed independent output signals.

Furthermore, temperature and the size of the air gap affect the output signal of a magnetic sensing element. Consequently, operation over wide temperature and air gap size ranges requires some form of compensation for the resultant signal drift, both in amplitude and offset. The most common approach is the use of two matched sensing elements operating in a differential mode thereby providing a common mode rejection.

High accuracy and repeatability magnetic position sensors employ two matched sensing elements such as magnetoresistors (MR) or Hall generators. They are spaced a few mm apart from each other, either in the axial direction (dual track target wheels) or along the target periphery (sequential sensors). The primary purpose of using two matched sensing elements is common mode signal rejection, since the sensing elements are equally affected by temperature and air gap. Having perfectly matched sensor elements, however, is not sufficient. The uniformity of the bias magnet, packaging tolerances, and inaccuracies of sensor installation can introduce unknown offsets to the output signals of the sensing elements. Presently, selection of matched MR pairs, a tight process control during all phases of sensor manufacture with a final testing of each sensor, is employed to build sensors meeting the required specifications. Unfortunately, this approach increases the final cost of the sensor.

Angular position information is contained in the location of target wheel tooth edges (i.e., tooth/slot transitions), and at these locations the output signals of the MRs are by design unequal so that their differential signal is nonzero. Over a slot or tooth, both MR output signals should be equal so that their differential signal is zero but, frequently, the MRs are not well matched resulting in a nonzero differential signal causing an erroneous output signal and switching leading to an incorrect crank position and speed of rotation.

Figure 1:
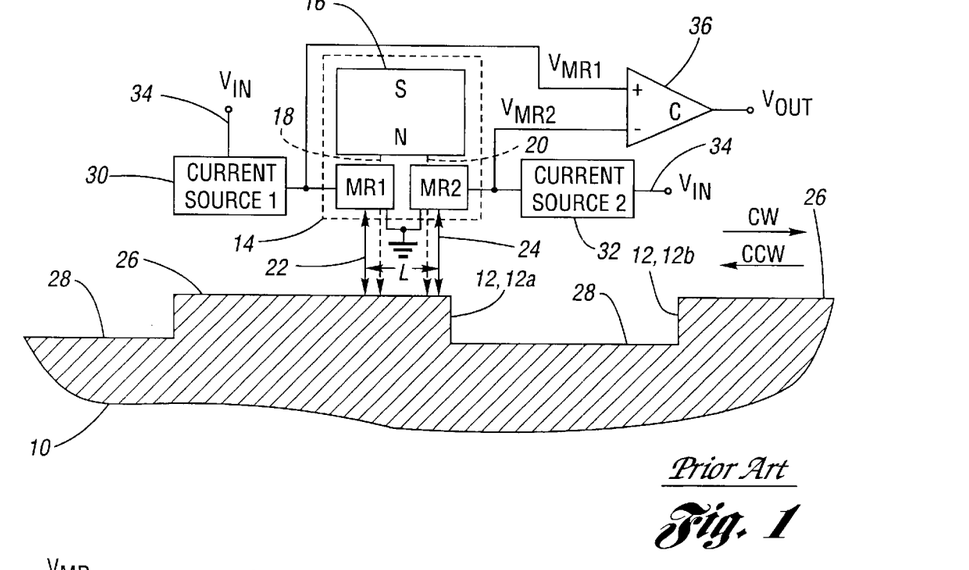
FIG. 1 is a schematic representation of an exemplar automotive environment of use of a prior art dual MR position sensor.

An example of such a sensor is the sequential crankshaft sensor used on several of General Motors Corporation trucks. This sensor employs two InSb magnetoresistor elements located radially proximate to the target wheel, one being slightly displaced with respect to the other in the direction of target wheel rotation. FIG. 1 is a schematic representation of an exemplar automotive environment of use according to this prior art scheme, wherein a target wheel 10 is rotating, such as for example in unison with a crankshaft, a drive shaft or a cam shaft, and the rotative position thereof is to be sensed. Rotative position of the target wheel 10 is determined by sensing the passage of a tooth edge 12, either a rising tooth edge 12a or a falling tooth edge 12b, using a single dual MR differential sequential sensor 14. A tooth edge 12 is considered rising or falling depending upon the direction of rotation of the target wheel 10 with respect to the magnetoresistive sensors MR1 and MR2. MR1 is considered leading and MR2 is considered lagging if the target wheel 10 is rotating in a clockwise (CW) direction whereas if the target wheel is rotating in a counterclockwise (CCW) direction then MR1 is considered lagging whereas MR2 is considered leading. For purposes of example, the target wheel 10 will be assumed to be rotating in a CW direction in the views.

The single dual MR differential sequential sensor 14 employs two magnetoresistor elements, MR1 and MR2, which are biased by a permanent magnet 16, wherein the magnetic flux 18 and 20 emanating therefrom are represented by the dashed arrows. The magnetic flux 18 and 20 pass from the permanent magnet 16 through the magnetoresistors MR1 and MR2 and through the air gaps 22 and 24 to the target wheel 10. The target wheel 10 is made of a magnetic material having teeth 26 and spacings 28 therebetween. The spacing L between MR1 and MR2 is generally such that the trigger points for the rising and falling edges of the output signal $V_{OUT}$ are dependent on the leading MR only, as will be later described.

Power $V_{IN}$ is supplied to CURRENT SOURCE1 30 and CURRENT SOURCE2 32 through voltage source 34. Power is also supplied to a comparator 36 (with hysteresis) through voltage source 34, but is not shown. CURRENT SOURCE1 30 supplies current to MR1 thereby providing for an output voltage $V_{MR1}$ from MR1. CURRENT SOURCE2 32 supplies current to MR2 thereby providing for an output voltage $V_{MR2}$ from MR2. Output voltages $V_{MR1}$, and $V_{MR2}$ are input into the comparator 36 whose output voltage $V_{OUT}$ is an indication of the position of rotation of the target wheel 10. It is to be understood that all voltages are measured with respect to ground unless otherwise indicated herein, and that CURRENT SOURCE1 30 is matched to CURRENT SOURCE2 32.

Figure 2A:
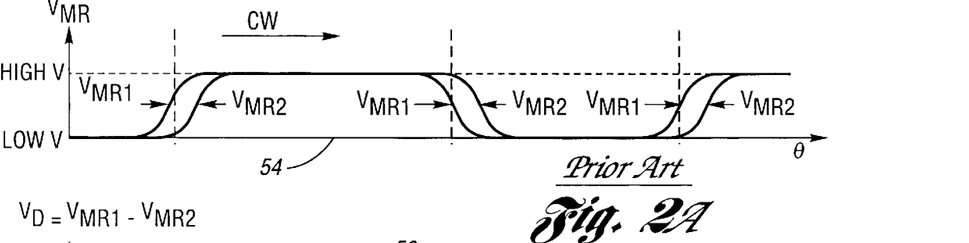
FIG. 2A depicts a plot of MR voltages for a CW rotation of the target wheel according to the prior art wherein the MR elements are matched.
Figure 2B:
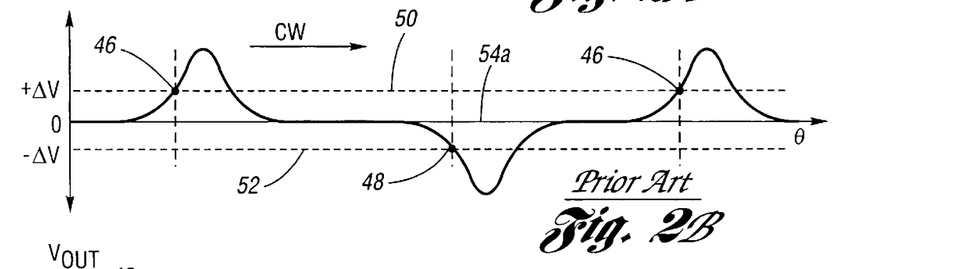
FIG. 2B depicts a plot of the differential voltage $V_D = V_{MR1} - V_{MR2}$ of FIG. 2A according to the prior art wherein the MR elements are matched.

In a first example, wherein the two MR elements are matched, as shown in FIG. 2A, the lagging MR element, in this case MR2, provides a delayed signal in every respect identical to the signal from the leading MR, in this case MR1. The differential signal $V_D = V_{MR1} - V_{MR2}$, shown in FIG. 2B is electronically generated within the comparator 36 and is then used by the comparator to reconstruct the signal $V_{OUT}$ (shown in FIG. 2C) emulating the profile of the target wheel 10. Upon a closer inspection of FIGS. 2A, 2B and 2C, it becomes evident that the rising edges 42 and the falling edges 44 of the sensor output signal $V_{OUT}$ are determined only by first points 46 corresponding to the rising edges and second points 48 corresponding to the falling edges where the signal from the leading MR, in this example MR1, crosses a first threshold voltage 50 corresponding to the first points and a second threshold voltage 52 corresponding to the second points wherein the first and second threshold voltages are determined by the hysteresis applied to the comparator 36. The lagging MR, in this example MR2, has no part in the generation of the rising edges 42 or the falling edges 44 of the output signal $V_{OUT}$. The lagging MR, MR2, in this example, has the same offset voltage 54 as the leading MR, MR1, thereby leading to a zero voltage difference in the differential signal $V_D = V_{MR1} - V_{MR2}$ whenever MR1 and MR2 are not adjacent to or in close proximity to a rising tooth edge 12a or a falling tooth edge 12b of the target wheel 10 due to the matching of the MRs as depicted by signal line 54a in FIG. 2B.

As previously stated, over a slot or tooth, both MR output signals should be equal so that their differential signal is zero but, frequently, the MRs are not well matched resulting in a nonzero differential signal causing switching errors and an erroneous output signal leading to incorrect crank positions and speeds of rotation. Mismatch of the MRs can occur due to offset differences resulting in different bias voltages for each MR or due to gain (sensitivity) differences resulting in different signal amplitudes for each MR or due to a combination of offset and gain differences between the MRs.

Figure 3A:
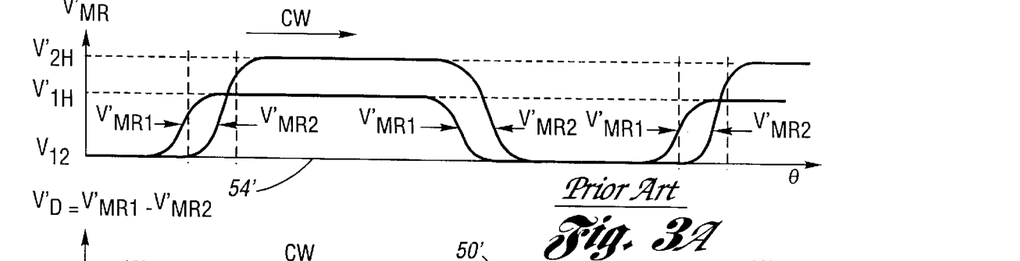
FIG. 3A depicts a plot of MR voltages for a CW rotation of the target wheel according to the prior art wherein the MR elements have a gain mismatch over a tooth.

FIG. 3A is a second example of a schematic representation of an exemplar automotive environment of use according to this prior art scheme wherein the two MR elements of the sensor, configured as in FIG. 1, are mismatched due to a gain error wherein MR1 has a lower voltage $V'_{1H}$ over a tooth 26 than the voltage $V'_{2H}$ over the same respective tooth produced by MR2 whereas both MRs have the same voltage $V_{12}$ over a slot 28 of the target wheel 10.

Figure 3B:
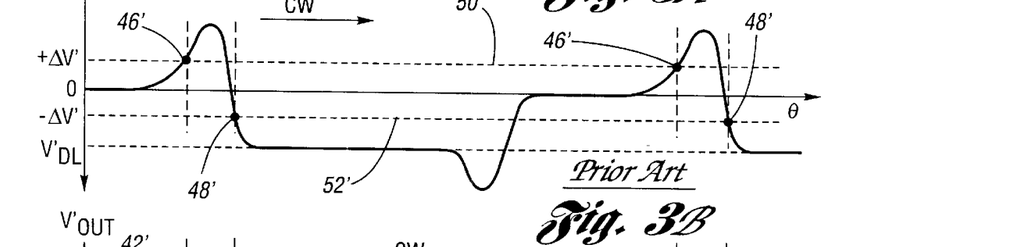
FIG. 3B depicts a plot of the differential voltage $V'_D = V'_{MR1} - V'_{MR2}$ of FIG. 3A according to the prior art wherein the MR elements have a gain mismatch over a tooth.

In this second example, as shown in FIG. 3A, the lagging MR element, in this case MR2, provides a delayed signal having a voltage gain offset $V'_{2H} - V'_{1H}$ over a tooth 26. The differential signal $V'_D = V'_{MR1} - V'_{MR2}$, shown in FIG. 3B is electronically generated within the comparator 36 and is then used by the comparator to reconstruct the signal $V'_{OUT}$ (shown in FIG. 3C) which should emulate the profile of the target wheel 10. Upon a closer inspection of FIGS. 3A, 3B and 3C, it becomes evident that the rising edges 42' of the sensor output signal $V'_{OUT}$ are determined only by first points 46' corresponding to the rising edges where the signal from the leading MR, in this example MR1, crosses a first threshold voltage 50' corresponding to the first points wherein the first threshold voltage is determined by the positive hysteresis $+\Delta V'$ applied to the comparator 36 whereas the falling edges 44' of the sensor output signal $V'_{OUT}$ are determined only by second points 48' corresponding to the falling edges where the signal from the lagging MR, in this example MR2, crosses a second threshold voltage 52' corresponding to the second points wherein the second threshold voltage is determined by the negative hysteresis $-\Delta V'$ applied to the comparator.

Figures 3C, 4A, 4B, 4C:
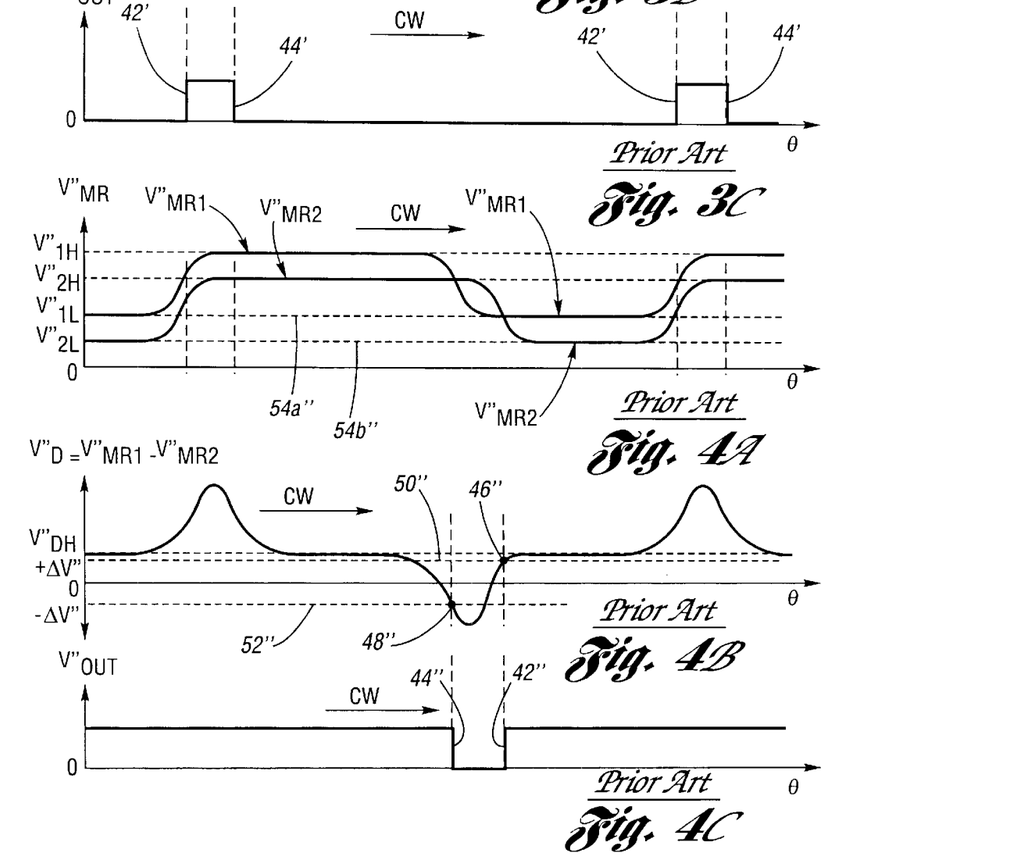
FIG. 3C depicts a plot of the output voltage $V'_{OUT}$ of the comparator according to the prior art wherein the MR elements have a gain mismatch over a tooth.
FIG. 4A depicts a plot of MR voltages for a CW rotation of the target wheel according to the prior art wherein the MR elements have an offset mismatch.
FIG. 4B depicts a plot of the differential voltage $V''_D = V''_{MR1} - V''_{MR2}$ of FIG. 4A according to the prior art wherein the MR elements have an offset mismatch.
FIG. 4C depicts a plot of the output voltage $V''_{OUT}$ of the comparator according to the prior art wherein the MR elements have an offset mismatch.

However, in this particular example, due to the voltage gain error there is a nonzero voltage difference in the differential signal $V'_D = V'_{MR1} - V'_{MR2}$ whenever MR1 and MR2 are adjacent to or in close proximity to a tooth 26 of the target wheel 10 due to the mismatching of the MRs as depicted in FIG. 3B by voltage level $V'_{DL}$ wherein this example $V'_{DL}$ is at a lower voltage level than the negative hysteresis $-\Delta V'$ applied to the comparator 36. As shown in FIGS. 3B and 3C, this results in switching errors causing an erroneous output voltage $V'_{OUT}$ which does not emulate the profile of the target wheel 10.

FIG. 4A is a third example of a schematic representation of an exemplar automotive environment of use according to this prior art scheme wherein the two MR elements of the sensor, configured as in FIG. 1, are mismatched due to an offset error wherein MR1 has a higher bias voltage $V''_{MR1}$ over a tooth 26, represented by $V''_{1H}$, and a slot 28, represented by $V''_{1L}$, than the bias voltage $V''_{MR2}$ over the same respective teeth, $V''_{2H}$, and slots, $V''_{2L}$, produced by MR2.

In this third example, as shown in FIG. 4A, the lagging MR element, in this case MR2, provides a delayed signal in every respect identical to the signal from the leading MR, in this case MR1, except for the bias voltage offset $V''_{1H} - V''_{2H}$ over a tooth 26 and $V''_{1L} - V''_{2L}$ over a slot 28. The differential signal $V''_D = V''_{MR1} - V''_{MR2}$, shown in FIG. 4B is electronically generated within the comparator 36 and is then used by the comparator to reconstruct the signal $V''_{OUT}$ (shown in FIG. 4C) which should emulate the profile of the target wheel 10. Upon a closer inspection of FIGS. 4A, 4B and 4C, it becomes evident that the rising edges 42" of the sensor output signal $V''_{OUT}$ are determined only by first points 46" corresponding to the rising edges where the signal from the leading MR, in this example MR1, crosses a first threshold voltage 50" corresponding to the first points wherein the first threshold voltage is determined by the positive hysteresis $+\Delta V''$ applied to the comparator 36 whereas the falling edges 44" of the sensor output signal $V''_{OUT}$ are determined only by second points 48" corresponding to the falling edges where the signal from the lagging MR, in this example MR2, crosses a second threshold voltage 52" corresponding to the second points wherein the second threshold voltage is determined by the negative hysteresis $-\Delta V''$ applied to the comparator.

However, in this particular example, the lagging MR, MR2, has an offset voltage 54b" which is not the same as the offset voltage 54a" of the leading MR, MR1, thereby leading to a nonzero voltage difference in the differential signal $V''_D = V''_{MR1} - V''_{MR2}$ whenever MR1 and MR2 are not adjacent to or in close proximity to a rising tooth edge 12a or a falling tooth edge 12b of the target wheel 10 due to the mismatching of the MRs as depicted in FIG. 4B by voltage level $V''_{DH}$ wherein this example $V''_{DH}$ is at a higher voltage level than the positive hysteresis $+\Delta V''$ applied to the comparator 36. As shown in FIGS. 4B and 4C, this results in switching errors causing an erroneous output voltage $V''_{OUT}$ which does not emulate the profile of the target wheel 10.

What is needed is a method and apparatus wherein continuous adaptive matching of both MR output signals during sensor operation of a single dual element sensor, preferably, but not exclusively, a single dual element magnetoresistive sensor, is utilized to sense crankshaft position and rotational speed from the passage of single tooth edges of an encoder or target wheel.

SUMMARY OF THE INVENTION

The present invention provides a method and apparatus wherein a single dual element galvanomagnetic sensor, herein exemplified by a single dual element magnetoresistive sensor, is utilized to sense crankshaft position and rotational speed from the passage of single tooth edges of an encoder or target wheel by continuous adaptive matching of both MR output signals during sensor operation. This eliminates the need for precise MR die matching, lowering their cost. Furthermore, the yield of good sensors would be significantly higher. And finally, the installed sensor would be less affected by variations during its service.

Over a slot or tooth, both MR output signals should be equal but, frequently, they are not well matched. However, during this time, they could be matched by adjusting the current of at least one of the current sources driving the MRs, which could be done over a slot or tooth via comparison of the voltage extrema, be that a maximum using peak detectors, or a minimum using valley detectors. Due to higher magnetic sensitivity at smaller air gaps, matching by current adjustment over a tooth is preferred.

In a preferred embodiment of the present invention, one MR is driven by a constant current source while the other MR is driven by a voltage controlled current source. The output voltages of the MRs approximate the tooth pattern of the target wheel; they are high over a tooth and low over a slot. Hence, the signals over the teeth can be simply acquired by means of a peak detector, one for each MR. The signals from the peak detectors are subtracted from each other and, optionally, amplified. This signal is now used as a control voltage which is fed into a voltage controlled current source changing its preset nominal current to a value that minimizes the mismatch of MR signals. If, for whatever reason, matching of MR signals over slots would be desired, valley detectors would be substituted for the peak detectors. The actual sensor output signal is derived using a comparator with hysteresis.

Accordingly, it is an object of the present invention to provide a digital output voltage for detecting angular position of a rotating target wheel utilizing a single dual element sensor by continuous adaptive matching of the MR signals over a tooth or a slot of a target wheel.

This, and additional objects, advantages, features, and benefits of the present invention will become apparent from the following specification.

DESCRIPTION OF THE PREFERRED EMBODIMENT

Figure 5A:
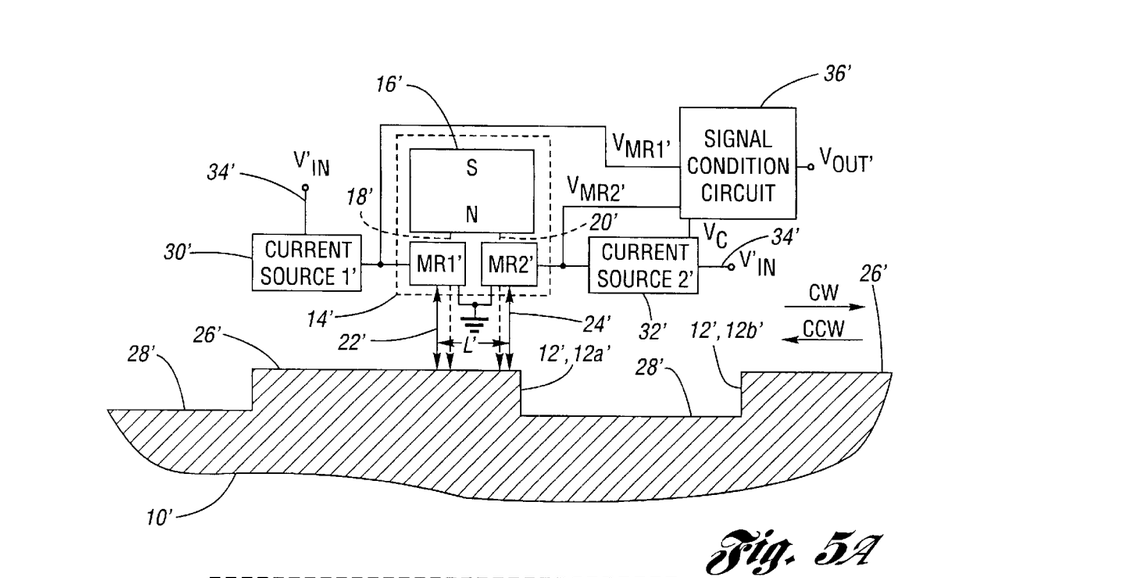
FIG. 5A depicts an example of a preferred environment of use of a dual MR position sensor according to the present invention.

FIG. 5A is a schematic representation of an exemplar automotive environment of use of the present invention, wherein a target wheel 10' is rotating, such as for example in unison with a crankshaft, a drive shaft or a cam shaft, and the rotative position and/or speed thereof is to be sensed. Rotative position of the target wheel 10' is determined by sensing the passage of a tooth edge 12', either a rising tooth edge 12a' or a falling tooth edge 12b', using a single dual MR differential sequential sensor 14'. A tooth edge 12' is considered rising or falling depending upon the direction of rotation of the target wheel 10' with respect to the magnetoresistive sensors MR1' and MR2'. MR1' is considered leading and MR2' is considered lagging if the target wheel 10' is rotating in a clockwise (CW) direction. Whereas, if the target wheel is rotating in a counterclockwise (CCW) direction then MR1' is considered lagging and MR2' is considered leading. For purposes of example, the target wheel 10' will be assumed to be rotating in a CW direction in the views.

The single dual MR differential sequential sensor 14' employs two magnetoresistor elements, MR1' and MR2', which are biased by a permanent magnet 16', wherein the magnetic flux 18' and 20' emanating therefrom is represented by the dashed arrows. The magnetic flux 18' and 20' passes from the permanent magnet 16' through the magnetoresistors MR1' and MR2' and through the air gaps 22' and 24' to the target wheel 10'. The target wheel 10' is made of a magnetic material having teeth 26' and spacings 28' therebetween. The spacing L' between MR1' and MR2' is generally such that the trigger points for the rising and falling edges of the output signal $V_{OUT}$ are dependent on the leading MR only as will be later described.

Power $V'_{IN}$ is supplied to CURRENT SOURCE1 30' and CURRENT SOURCE2 32' through voltage source 34'. Power is also supplied to a signal conditioning circuit 36' through voltage source 34' (the connection therefor not being shown). CURRENT SOURCE1 30' supplies current to MR1' thereby providing for an output voltage $V_{MR1'}$. from MR1'. CURRENT SOURCE2 32' supplies current to MR2' thereby providing for an output voltage $V_{MR2'}$ from MR2'. Output voltages $V_{MR1'}$ and $V_{MR2'}$ are input into the signal conditioning circuit 36' whose output voltage $V_{OUT}$ is an indication of the position of rotation of the target wheel 10'. It is to be understood that all voltages are measured with respect to ground unless otherwise indicated herein, and that CURRENT SOURCE1' 30' is constant current source whereas CURRENT SOURCE2' 32' is a voltage controlled current source. The implementation of CURRENT SOURCE1 30' and CURRENT SOURCE2 32' are well known in the art.

Figures 5B, 5C:
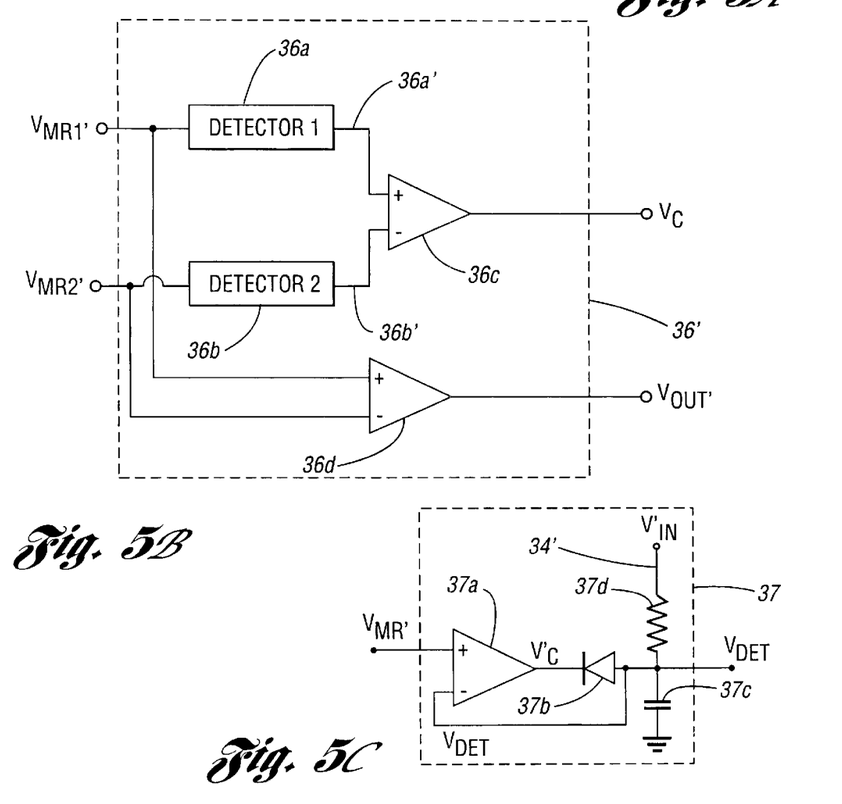
FIG. 5B depicts an example of the signal conditioning circuit of FIG. 5A.
FIG. 5C depicts an example of a valley detector.

FIG. 5B depicts the signal conditioning circuit 36' consisting of DETECTOR1 36a, DETECTOR2 36b, differential amplifier 36c (with gain), and comparator 36d. To match MR1' and MR2' over a tooth 26' of the target wheel 10', DETECTOR1 36a and DETECTOR2 36b would both be peak detectors wherein DETECTOR1 would detect the maximum voltage of MR1', $V_{MR1'}$, over a tooth and DETECTOR2 would detect the maximum voltage of MR2', $V_{MR2'}$, over a tooth. Whereas, to match MR1' and MR2' over a slot 28' of the target wheel, DETECTOR1 and DETECTOR2 would both be valley detectors wherein DETECTOR1 would detect the minimum voltage of MR1', $V_{MR1'}$, over a slot and DETECTOR2 would detect the minimum voltage of MR2', $V_{MR2'}$, over a slot. The outputs of DETECTOR1 36a and DETECTOR2 36b are fed into differential amplifier 36c producing a differential peak voltage $V_C$. The differential peak voltage $V_C$ is applied to the voltage controlled current source CURRENT SOURCE2' 32' as a control voltage which changes the preset nominal current of CURRENT SOURCE2' to a value that minimizes the mismatch of MR1' and MR2' over a tooth 26' or slot 28' according to the actualization of DETECTOR1 36a and DETECTOR2 36b as peak detectors or valley detectors as previously described.

Initially, CURRENT SOURCE2' 32' is preset for initial turn-on to have a nominal current which, for example, may be the same value as the current of CURRENT SOURCE1' 30'. In FIGS. 5A and 5B, a positive differential control voltage $V_C$ indicates that the voltage of MR1', $V_{MR1'}$, over a tooth 26' is greater than the voltage of MR2', $V_{MR2'}$, over a tooth if DETECTOR1 36a and DETECTOR2 36b are peak detectors or that the voltage of MR1', $V_{MR1'}$, over a slot 28' is greater than the voltage of MR2', $V_{MR2'}$, over a slot if DETECTOR1 36a and DETECTOR2 36b are valley detectors. In this case, $V_C$ would increase the current of CURRENT SOURCE2' 32' to a new value proportional to the magnitude of $V_C$ thereby increasing the voltage of MR2', $V_{MR2'}$, toward the value of the voltage of MR1', $V_{MR1'}$, over a tooth 26' or slot 28' thus tending to match MR1' and MR2'. On the other hand, a negative differential control voltage $V_C$ indicates that the voltage of MR1', $V_{MR1'}$, over a tooth 26' is less than the voltage of MR2', $V_{MR2'}$, over a tooth if DETECTOR1 36a and DETECTOR2 36b are peak detectors or that the voltage of MR1', $V_{MR1'}$, over a slot 28' is less than the voltage of MR2', $V_{MR2'}$, over a slot if DETECTOR1 36a and DETECTOR2 36b are valley detectors. In this case, $V_C$ would decrease the current of CURRENT SOURCE2' 32' to a new value proportional to the magnitude of $V_C$ thereby decreasing the voltage of MR2', $V_{MR2'}$, toward the value of the voltage of MR1', $V_{MR1'}$, over a tooth 26' or slot 28' thus tending to match MR1' and MR2'.

$V_{MR1'}$ and $V_{MR2'}$ are also input to comparator 36d (with hysteresis) producing the output voltage $V_{OUT}$ which emulates the profile of the target wheel 10'. The operation of comparator 36d is commensurate to the operation of comparator 36 in FIG. 1 and has been previously described.

In a first example of the present invention, wherein MR1' and MR2' are matched, the voltage $V_{MR1'}$ over a tooth 26' has the same value as the voltage $V_{MR2'}$ over the same respective tooth and the voltage $V_{MR1'}$ over a slot 28' has the same value as the voltage $V_{MR2'}$ over the same respective slot.

Figure 2C:
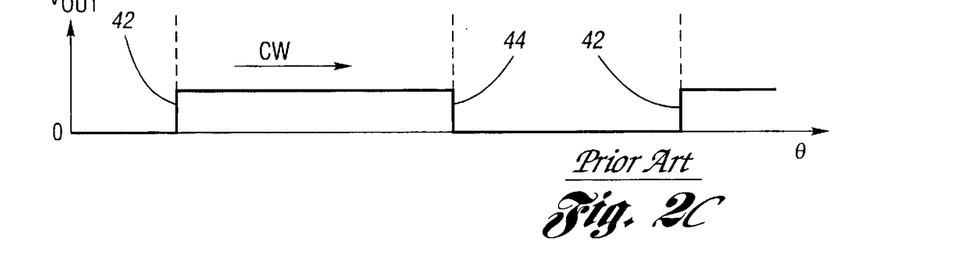
FIG. 2C depicts a plot of the output voltage $V_{OUT}$ of the comparator according to the prior art wherein the MR elements are matched.

Using peak detectors for DETECTOR1 36a and DETECTOR2 36b to match MR2' to MR1' over a tooth 26' generates equal peak values for the voltages on signal line 36a' and 36b' which are input to the differential amplifier 36c producing a differential control voltage $V_C$ of zero thereby maintaining the current of CURRENT SOURCE2' 32' at its preset nominal value whereby MR1' and MR2' analogously emulate the actions of MR1 and MR2 in FIGS. 2A, 2B, and 2C of the prior art as previously described.

On the other hand, using valley detectors for DETECTOR1 36a and DETECTOR2 36b to match MR2' to MR1' over a slot 28' generates equal valley values for the voltages on signal line 36a' and 36b' which are input to the differential amplifier 36c producing a differential control voltage $V_C$ of zero thereby maintaining the current of CURRENT SOURCE2' 32' at its preset nominal value whereby MR1' and MR2' analogously emulate the actions of MR1 and MR2 in FIGS. 2A, 2B, and 2C of the prior art as previously described.

In a second example of the present invention, the two MR elements of the sensor, configured as in FIG. 5A, are mismatched due to an offset error, MR1' has a higher bias voltage $V_{MR1'}$ over a tooth 26' and a slot 28' than the respective bias voltage $V_{MR2'}$ over the same respective teeth and slots produced by MR2', as analogously depicted in FIG. 4A of the prior art.

Using peak detectors for DETECTOR1 36a and DETECTOR2 36b to match MR2' to MR1' over a tooth 26' generates a higher peak value for the voltage on signal line 36a' than the peak value for the voltage on signal line 36b' which are input to the differential amplifier 36c producing a positive differential control voltage $V_C$ thereby increasing the current of CURRENT SOURCE2' 32' to a new value proportional to the magnitude of $V_C$ thus increasing the voltage of MR2', $V_{MR2'}$, toward the value of the voltage of MR1', $V_{MR1'}$, over a tooth 26' and thereby matching MR1' and MR2'. When MR1' and MR2' are matched, the peak detectors DETECTOR1 36a and DETECTOR2 36b generate equal peak values for the voltages on signal line 36a' and 36b' which are input to the differential amplifier 36c producing a differential control voltage $V_C$ of zero thereby maintaining the current of CURRENT SOURCE2' 32' at its preset nominal value whereby MR1' and MR2' analogously emulate the actions of MR1 and MR2 in FIGS. 2A, 2B, and 2C of the prior art as previously described.

On the other hand, using valley detectors for DETECTOR1 36a and DETECTOR2 36b to match MR2' to MR1' over a slot 26' generates a higher valley value for the voltage on signal line 36a' than the valley value for the voltage on signal line 36b' which are input to the differential amplifier 36c producing a positive differential control voltage $V_C$ thereby increasing the current of CURRENT SOURCE2' 32' to a new value proportional to the magnitude of $V_C$, thus increasing the voltage of MR2', $V_{MR2'}$, toward the value of the voltage of MR1', $V_{MR1'}$, over a slot 28' and thereby matching MR1' and MR2'. When MR1' and MR2' are matched, the valley detectors DETECTOR1 36a and DETECTOR2 36b generate equal valley values for the voltages on signal line 36a' and 36b' which are input to the differential amplifier 36c producing a differential control voltage $V_C$ of zero thereby maintaining the current of CURRENT SOURCE2' 32' at its preset nominal value whereby MR1' and MR2' analogously emulate the actions of MR1 and MR2 in FIGS. 2A, 2B, and 2C of the prior art as previously described.

In a third example of the present invention, wherein the two MR elements of the sensor, configured as in FIG. 5A, are mismatched due to a gain error, MR1' has a lower voltage over a tooth 26' than the voltage over the same respective tooth produced by MR2' whereas both MRs have the same voltage over a slot 28' of the target wheel 10', as analogously depicted in FIG. 3A of the prior art.

Figure 6A:
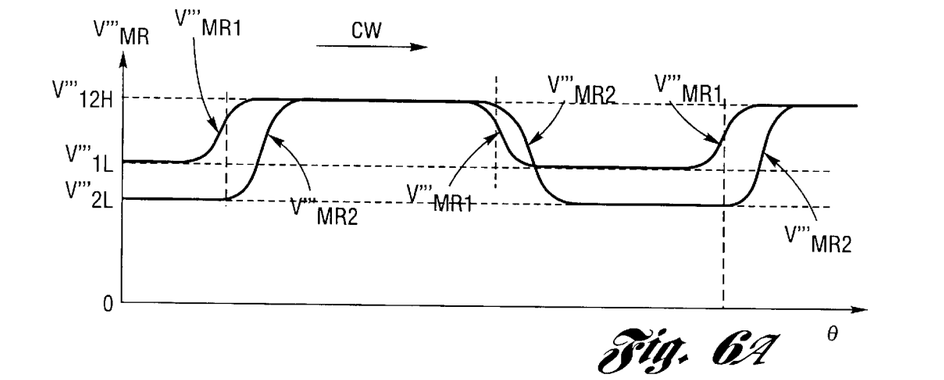
FIG. 6A depicts a plot of the MR voltage for a CW rotation of the target wheel according to the present invention wherein the MR elements, having a gain mismatch are matched over the tooth.

Using peak detectors for DETECTOR1 36a and DETECTOR2 36b to match MR2' to MR1' over a tooth 26' generates a lower peak value for the voltage on signal line 36a' than the peak value for the voltage on signal line 36b' which are input to the differential amplifier 36c producing a negative differential control voltage $V_C$, thereby decreasing the current of CURRENT SOURCE2' 32' to a new value proportional to the magnitude of $V_C$ and thus decreasing the voltage of MR2', $V_{MR2'}$, toward the value of the voltage of MR1', $V_{MR1'}$, over a tooth 26' so as to thereby match MR1' and MR2' over a tooth. When MR1' and MR2' are matched over a tooth 26' as depicted in FIG. 6A, the differential control voltage $V_C$ is zero, thereby maintaining the current of CURRENT SOURCE2' 32' at its former value set by $V_C$. However, in this case, as depicted in FIG. 6A, MR1' and MR2' may not be matched over a slot 28' resulting in a voltage offset $V_{OF}$ in the differential signal $V'''_D = V'''_{MR1} - V'''_{MR2}$ as shown in FIG. 6B.

Figure 6B:
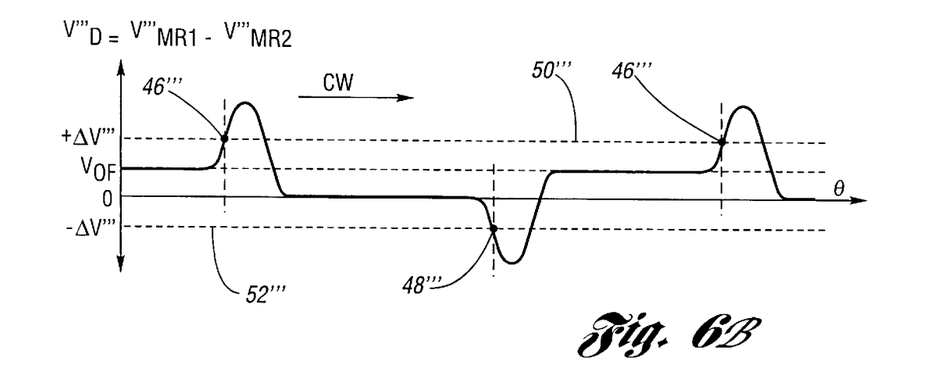
FIG. 6B depicts a plot of the differential voltage $V'''_D = V'''_{MR1} - V'''_{MR2}$ of FIG. 6A according to the present invention wherein the MR elements, having a gain mismatch are matched over the tooth.
Figure 6C:
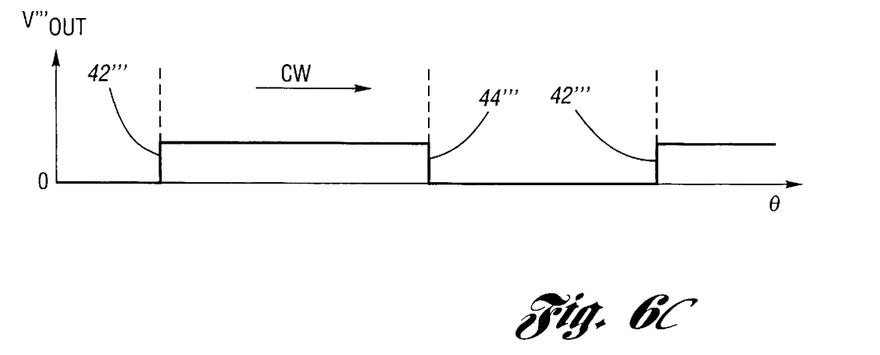
FIG. 6C depicts a plot of the output voltage $V''''_{OUT}$ of the comparator according to the present invention wherein the MR elements, having a gain mismatch are matched over the tooth.

The differential signal $V'''_D = V'''_{MR1} - V'''_{MR2}$, shown in FIG. 6B is electronically generated within the comparator 36d and is then used by the comparator to reconstruct the signal $V'''_{OUT}$ (shown in FIG. 6C) emulating the profile of the target wheel 10'. Upon a closer inspection of FIGS. 6A, 6B and 6C, it becomes evident that the rising edges 42''' and the falling edges 44''' of the sensor output signal $V'''_{OUT}$ are determined only by first points 46''' corresponding to the rising edges and second points 48''' corresponding to the falling edges where the signal from the leading MR, in this example MR1', crosses a first threshold voltage 50''' corresponding to the first points and a second threshold voltage 52''' corresponding to the second points wherein the first and second threshold voltages are determined by the hysteresis applied to the comparator 36d. Both MRs in this example have the same voltage $V'''_{12H}$ (shown in FIG. 6A) over a tooth 26' thereby leading to a zero voltage difference in the differential signal $V'''_D = V'''_{MR1} - V'''_{MR2}$ whenever MR1' and MR2' are adjacent to or in close proximity to a tooth of the target wheel 10' due to the matching of the MRs over a tooth as shown in FIG. 6B and previously described. Over a slot 28', the voltage of MR1', $V'''_{1L}$, is not the same as the voltage of MR2', $V'''_{2L}$ thereby leading to a voltage offset $V_{OF}$ in the differential signal $V'''_D = V'''_{MR1} - V'''_{MR2}$ whenever MR1' and MR2' are adjacent to or in close proximity to a slot of the target wheel 10' as depicted in FIG. 6B. However, decreasing the current of CURRENT SOURCE2' 32' decreases the voltage of MR2', $V_{MR2'}$, such that, as shown in FIG. 6B, the magnitude of the voltage offset $V_{OF}$ is less than the magnitude of the hysteresis applied to the comparator 36d, thereby not affecting the determination of the rising edges 42''' or the falling edges 44''' of the sensor output signal $V'''_{OUT}$ as previously described. Thus, the sensor output signal $V'''_{OUT}$ as depicted in FIG. 6C emulates the profile of the target wheel 10'.

These examples are not to be considered limiting, as other mismatches involving offset and gain errors are possible such as those in which DETECTOR1 36a and DETECTOR2 36b are valley detectors instead of peak detectors.

The implementation of the valley detector is well known in the art, but, perhaps, not as familiar as the peak detector, and is hereby presented for illustrative purposes. FIG. 5C depicts an example of the valley detector 37. $V_{MR'}$ is representative of $V_{MR1'}$ or $V_{MR2'}$ whereas $V_{DET}$ is representative of the output of DETECTOR1 36a or DETECTOR2 36b and capacitor 37c is initially charged to $V'_{IN}$ 34' thereby setting the value of $V_{DET}$ to $V'_{IN}$. When $V_{MR'}$ is less than $V_{DET}$, the output $V'_C$ of the comparator 37a goes low and forward biases the diode 37b. The capacitor 37c will now quickly discharge through the diode 37b and the comparator 37a (due to a very small discharge time constant) until $V_{DET}$ becomes greater than $V_{MR'}$. Now, the output $V'_C$ of the comparator 37a goes high and reverse biases the diode 37b. The capacitor 37c will now start charging through the resistor 37d. The charging time (i.e., RC time constant) is adjusted such that the capacitor 37c charges very slowly compared to a tooth-slot time cycle, thereby essentially maintaining the voltage of the previous input $V_{MR'}$ as the present output voltage $V_{DET}$. However, if a subsequent input $V_{MR'}$ has a lower voltage than the present output $V_{DET}$ then $V_{MR'}$ is less than $V_{DET}$ and the capacitor 37c will quickly discharge to the new value of the input $V_{MR'}$ as the new value of the output $V_{DET}$.

It is to be understood that while a magnetoresistor (MR) was exemplified in the foregoing detailed description of a preferred embodiment of the present invention, other analogous sensing elements, such as hall elements my be utilized, the class of such sensors being inclusively denoted as galvanomagnetic elements.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A differential magnetic position sensor with adaptive matching for detecting angular position of a toothed target wheel, comprising:

a single differential sensor comprising a first galvanomagnetic element and a second galvanomagnetic element;

means for magnetically biasing said single differential sensor;

a target wheel having a plurality of teeth and slots which define a plurality of tooth edges, said target wheel being rotatively disposed in relation to said single differential sensor, said first and second galvanomagnetic elements being spaced circumferentially with respect to said target wheel;

current source means connected with said single differential sensor for providing first and second voltages respectively from each of said first and second galvanomagnetic elements responsive to each tooth edge of said plurality of tooth edges passing said single differential sensor; and signal conditioning circuit means connected with said single differential sensor for providing a voltage output responsive to said first and second voltages indicative of angular position of the target wheel relative to said single differential sensor, said signal conditioning circuit further comprising matching means for continuous adaptive matching of the first and second voltages over at least one of the teeth and the slots of the target wheel.

2. The apparatus of claim 1, wherein said current source means provides a first voltage to said first galvanomagnetic element and a second voltage to said second galvanomagnetic element, wherein at least one of said first and second voltages is adjusted to provide said adaptive matching.

3. The apparatus of claim 2, wherein said adaptive matching comprises matching at least one of offset and gain of said first and second voltages over at least one of a tooth and a slot of the target wheel.

4. The apparatus of claim 3, wherein said signal conditioning means comprises:

first detector means for detecting a first extrema of said first voltage;

second detector means for detecting a second extrema of said second voltage;

differential amplifier means for detecting a voltage difference between said first and second extrema of said first and second voltages and for providing a differential voltage responsive to said voltage difference;

voltage adjustment means for adjusting at least one of said first and second voltages responsive to said differential voltage to thereby provide said adaptive matching; and comparator means for providing an output signal responsive to said first and second voltages; and means for converting said output signal into a digital output signal providing said output voltage.

5. The apparatus of claim 4, wherein said first detector means is a first peak detector, and said second detector means is a second peak detector.

6. The apparatus of claim 4, wherein said first detector means is a first valley detector, and said second detector means is a second valley detector.

7. A method for detecting rotation of a toothed target wheel comprising the steps of:

generating a first voltage responsive to passage of a tooth edge of a rotating toothed target wheel having at least one tooth and at least one slot across a first predetermined location;

generating a second voltage responsive to passage of the tooth edge of the target wheel across a second predetermined location, wherein said first and second predetermined locations are closely proximate to each other;

continuously adaptively matching said first and second voltages over at least one of the at least one slot and the at least one tooth of the target wheel to thereby provide two identically angularly offset signals; and electronically processing said offset signals to provide an output voltage indicative of angular position of the tooth edge across the first and second predetermined locations.

8. The method of claim 7, wherein said step of adaptively matching comprises:

detecting a predetermined extrema of said first voltage;

detecting a predetermined extrema of said second voltage;

detecting a voltage difference between said predetermined extrema of said first and second voltages;

generating a differential voltage responsive to said voltage difference; and adjusting at least one of said first and second voltages responsive to said differential voltage to thereby provide said adaptive matching.

9. The method of claim 8, wherein said first and second steps of detecting detect, respectively, peak voltages of said first and second voltages.

10. The method of claim 8, wherein said first and second steps of detecting detect, respectively, minimum voltages of said first and second voltages.

* * * * *